(12) United States Patent
Notorgiacomo (10) Patent No.: US 6,974,849 B2
(45) Date of Patent: Dec. 13, 2005

(54) POLYACETALS WITH IMPROVED RESISTANCE TO BLEACH

(75) Inventor: Vincent J. Notorgiacomo, Rockaway, NJ (US)

(73) Assignee: Ticona LLC, Summit, NJ (US)

( * ) Notice: Subject to any disclaimer, the term of this patent is extended or adjusted under 35 U.S.C. 154(b) by 0 days.

(21) Appl. No.: 10/377,982

(22) Filed: Mar. 3, 2003

(65) Prior Publication Data

US 2004/0176508 A1 Sep. 9, 2004

(51) Int. Cl.$^7$ ............... C08K 5/098; C08K 5/5357; C08K 5/52; C08K 5/37; C08K 5/134
(52) U.S. Cl. ............... 524/141; 524/291; 524/342; 524/378; 524/400; 524/417; 524/424; 524/425; 524/432
(58) Field of Search ............... 524/141, 291, 524/342, 477, 378, 400, 417, 424, 425, 432

(56) References Cited

U.S. PATENT DOCUMENTS

| | | | | |
|---|---|---|---|---|
| 3,699,062 A | 10/1972 | Starr et al. | ......... | 260/18 N |
| 4,274,986 A | 6/1981 | Ikenaga et al. | ......... | 260/22 CQ |
| 4,351,916 A | * 9/1982 | Kohan | ......... | 524/377 |
| 4,418,162 A | 11/1983 | Kasuga et al. | ......... | 523/205 |
| 4,517,319 A | 5/1985 | Reske et al. | ......... | 523/200 |
| 4,559,380 A | 12/1985 | Kasuga et al. | ......... | 524/317 |
| 4,596,847 A | * 6/1986 | Kasuga et al. | ......... | 524/220 |
| 4,647,609 A | 3/1987 | O'Brien | ......... | 524/267 |
| 4,649,179 A | 3/1987 | Takagaki | ......... | 525/400 |
| 4,731,396 A | 3/1988 | Auerbach et al. | ......... | 523/439 |
| 4,780,498 A | 10/1988 | Goerrissen | ......... | 524/456 |
| 4,831,073 A | 5/1989 | Okushiro et al. | ......... | 524/424 |
| 4,836,899 A | 6/1989 | Clemens | ......... | 204/130 |
| 4,837,400 A | 6/1989 | Walter et al. | ......... | 524/145 |
| 4,861,814 A | 8/1989 | Nakagawa et al. | ......... | 524/102 |
| 4,886,851 A | 12/1989 | Ikenaga et al. | ......... | 524/425 |
| 4,996,253 A | 2/1991 | Mulholland | ......... | 524/91 |
| 5,059,644 A | * 10/1991 | Kosinski | ......... | 524/100 |
| 5,094,713 A | 3/1992 | Forschirm | ......... | 156/668 |
| 5,096,951 A | 3/1992 | Auerbach | ......... | 524/106 |
| 5,106,896 A | 4/1992 | Endo et al. | ......... | 524/318 |
| 5,118,734 A | * 6/1992 | Katsumata | ......... | 524/91 |
| 5,173,532 A | 12/1992 | Endo et al. | ......... | 524/425 |
| 5,212,222 A | 5/1993 | Mitsuuchi et al. | ......... | 524/230 |

(Continued)

FOREIGN PATENT DOCUMENTS

| | | | | |
|---|---|---|---|---|
| EP | 0 247 765 A2 | 12/1987 | ......... | C08L/59/00 |
| EP | 0 884 364 A1 | 12/1988 | ......... | C08L/59/02 |
| EP | 0 580 872 A1 | 2/1994 | ......... | C08L/59/00 |
| JP | 07228751 A | * 8/1995 | ......... | C08L/59/00 |

OTHER PUBLICATIONS

Derwent abstract ACC–NO: 1995–332651 (JP 7–228751–A).*
"Celcon Acetal Copolymer Short Term Properties Brochure," Celanese (Ticona, a business of Celanese AG), (©2001, Ticona) (00–304/5M/0301).

*Primary Examiner*—Matthew A. Thexton
(74) *Attorney, Agent, or Firm*—Michael W. Ferrell (57) ABSTRACT

A molding composition exhibiting bleach resistance includes a polyoxymethylene matrix polymer, from about 0.5 to about 10 weight percent of a bleach stabilizer selected from alkali metal or alkaline earth element carbonates or phosphates and mixtures thereof dispersed in the matrix resin. A bleach co-stabilizer is selected from the group consisting of: (a) a poly(alkoxy) stabilizer; (b) a zinc oxide stabilizer; (c) a color stabilizer consisting of a mixture of calcium citrate and calcium propionate, wherein the calcium citrate is the predominant component of the color stabilizer mixture; or (d) mixtures of two or more of (a), (b) and (c). The compositions exhibit a bleach resistance index of at least 2.0.

22 Claims, 2 Drawing Sheets

U.S. PATENT DOCUMENTS

| | | | |
|---|---|---|---|
| 5,298,537 A | 3/1994 | Vaidya | 523/205 |
| 5,354,798 A | 10/1994 | Tsukahar et al. | 524/413 |
| 5,432,216 A * | 7/1995 | Yu et al. | 524/102 |
| 5,478,563 A | 12/1995 | Erami | 424/409 |
| 5,478,895 A | 12/1995 | Sugiyama et al. | 525/398 |
| 5,482,987 A | 1/1996 | Forschirm | 524/230 |
| 5,519,075 A * | 5/1996 | Matsumoto et al. | 524/100 |
| 5,641,824 A | 6/1997 | Forschirm | 524/311 |
| 5,744,527 A * | 4/1998 | Katsumata et al. | 524/99 |
| 5,886,066 A | 3/1999 | Forschirm | 523/200 |
| 5,939,481 A | 8/1999 | Sugiyama et al. | 524/405 |
| 5,948,844 A | 9/1999 | Oka et al. | 524/399 |
| 6,156,834 A | 12/2000 | Seyama et al. | 524/321 |
| 6,284,828 B1 | 9/2001 | Takayama | 524/413 |

* cited by examiner

POLYACETALS WITH IMPROVED RESISTANCE TO BLEACH

TECHNICAL FIELD

This invention relates to polyoxymethylene compositions and molded articles made therefrom having improved bleach resistance. In particular, the invention is directed to increasing the durability of polyoxymethylene molded parts interfacing with bleaching agents, as seen for example, with parts used in washing machines and/or water treatment systems.

BACKGROUND OF THE INVENTION

Polyoxymethylene polymers, those having recurring —CH$_2$O— units, have been known for many years. These polymers may be prepared by the polymerization of anhydrous formaldehyde or by the polymerization of trioxane, which is a cyclic trimer of formaldehyde. Also known is the preparation of oxymethylene copolymers by copolymerizing trioxane with cyclic ethers such as dioxolane. These polymers and copolymers are used as molding resins. See U.S. Pat. No. 3,027,352, as well as "Acetal Resins", by T. J. Dolce and J. A. Grates, Second Edition Of Encyclopedia Of Polymer Science And Engineering, John Wiley And Sons, New York, 1985, Vol. 1 pp. 42–61.

Present state of the art includes means to impart desired properties to oxymethylene based molding compositions by inclusion of certain additives in order to maintain the workability and stability of the polymers. U.S. Pat. No. 5,173,532 discloses the use of calcium carbonate in polyoxymethylene compositions. U.S. Pat. No. 5,886,066 teaches use of at least about 0.25 weight percent of calcium carbonate to improve surface wear resistance. See, generally, U.S. Pat. Nos. 4,996,253; 4,517,319; 5,354,798; 6,284,828; and 4,996,253. As to increasing stability and impact strength see U.S. Pat. Nos. 3,699,062; 4,731,396; 4,780,498; 4,886,851; 6,156,834; and 4,831,073. As to increasing platability and color stability see U.S. Pat. Nos. 5,096,951; 5,094,713; 4,418,162; and 4,836,899. As to increasing thermal stability see U.S. Pat. Nos. 4,837,400; 5,948,844; 5,212,222; 5,939,481; 5,478,895; and 4,861,814. As to anti-static properties see U.S. Pat. Nos. 5,886,066; 4,647,609; 5,106,896; 5,641,824; 4,559,380; 4,649,179; and 4,274,986. As to improving frictional properties, see U.S. Pat. No. 5,482,987. As a carrier for anti-bacterial and anti-fungal agents see U.S. Pat. No. 5,478,563. As to decreasing porosity see U.S. Pat. No. 5,298,537. A recurring problem characteristic of polyoxymethylene molding resins is their susceptibility to degradation such as delamination by bleaching agents. Despite all of the advances made in the polyoxymethylene injection molding field, there is a need for improving bleach resistance of resin compositions and parts prepared therefrom.

SUMMARY OF THE INVENTION

It has been unexpectedly discovered that formulations of polyoxymethylene resins containing a basic additive such as calcium carbonate in specified amounts exhibit greatly increased bleach resistance.

There is provided in accordance with the present invention a molding composition exhibiting bleach resistance comprising a polyoxymethylene matrix polymer, from about 0.5 to about 10 weight percent of bleach stabilizer selected from alkali metal or alkaline earth element carbonates or phosphates and mixtures thereof dispersed in the matrix resin and a bleach co-stabilizer selected from the group consisting of: (a) a poly(alkoxy) stabilizer; (b) a zinc oxide stabilizer; (c) a color stabilizer consisting of a mixture of calcium citrate and calcium propionate, wherein the calcium citrate is the predominant component of the stabilizer mixture; or (d) mixtures of two or more of (a), (b) and (c). The compositions preferably exhibit a bleach resistance index of at least 2.0.

In another aspect of the invention there are provided injection molded parts adapted for interfacing aqueous bleach prepared from a composition comprising a polyoxymethylene matrix polymer, from about 0.5 to about 10 weight percent of bleach stabilizer wherein the bleach stabilizer is selected from alkali metal or alkaline earth element carbonates or phosphates and mixtures thereof dispersed in the matrix resin.

Still yet another aspect of the invention is directed to methods of using these parts comprising contacting same with an aqueous solution containing a bleaching agent.

BRIEF DESCRIPTION OF THE DRAWINGS

The invention is described below with reference to the attached Figures wherein.

DETAILED DESCRIPTION OF THE INVENTION

The present invention is described in detail below in connection with different embodiments. Such discussion is for purposes of illustration only and not intended to be limitative of the invention. Modifications to particular embodiments within the spirit and scope of the present invention, set forth in the appended claims, will be readily apparent to those of skill in the art.

DEFINITIONS, TEST METHODS AND MATERIALS

The terminology "antioxidant" means any substance that inhibits oxidation, examples of which include hexamethyleneglycol-bis(3,5-di-t-butyl-4-hydroxyhydrocinnamate), 2,2'-methylenebis(4-methyl-6-t-butylphenol), hexamethyleneglycol-bis(3,5-di-t-butyl-4-hydroxyhydrocinnamate), tetrabis>methylene(3,5-di-t-butyl-4-hydroxyhydrocinnamate)methane, triethyleneglycol-bis-3-(3-t-butyl-4-hydroxy-5-methylphenyl)propionate, 1,3,5-trimethyl-2,4,6-tris(3,5-di-t-butyl-4-hydroxy-benzyl)-benzene, p-octadecyl-3-(4'-hydroxy-3',5'-di-t-butyl-phenol)propionate, 4,4'-methylenebis(2,6-di-t-butylphenol), 4,4'-butylidene-bis-(6-t-butyl-3-methylphenol), 2,2'-thiodiethyl-bis>3-(3,5-di-t-butyl-4-hydroxyphenol)propionate, di-stearyl-3,5-di-t-butyl-4-hydroxybenzylphosphonate and 2-t-butyl-6-(3-t-butyl-5-methyl-2-hydroxybenzyl)-4-methylphenylacrylate, hexamethyleneglycol-bis(3,5-di-t-butyl-4-hydroxyhydrocinnamate), for example Irganox™ available from Ciba-Geigy, tetrakis>methylene(3,5-di-t-butyl-4-hydroxyhydrocinnamate) methane, for example Irganox 1010 made by Ciba-Geigy (New York) and triethyleneglycol-bis-3-(3-t-butyl-4-hydroxy-5-methylphenyl)propionate, for example are effective. Preferred antioxidants are hexamethyleneglycol-bis(3,5-di-t-butyl-4-hydroxyhydro-cinnamate) and triethyleneglycol-bis-3-(3-t-butyl-4-hydroxy-5-methylphenyl)propionate.

"Acrawax® C" means N,N'-ethylene bis-stearamide by Lonza, Inc., N.J.

"Bleach", "bleaching agents" and the like include hydrogen peroxide, sodium hypochlorite, sodium peroxide, sodium chlorite, calcium hypochlorite, hypochlorous acid and the like. Chlorinated lime is a bleaching powder used on an industrial scale. Household bleaching powders are sodium perborate and dichlorodimethylhydantoin.

"Bleach resistance index" means a ratio calculated as the delamination time measured by the Immersion Test, as defined herein, of a formulation comprising a bleach stabilizer selected from alkali metal or alkaline earth element carbonates or phosphates and mixtures thereof divided by the delamination time of a like formulation which does not include the above recited bleach stabilizer.

Most preferably, the formulations are identical except that unstabilized formulation has more matrix resin.

"Celcon® M90" means an acetal copolymer grade M90 which is a medium viscosity polymer having a density of 1410 Kg/m^3 and a melt flow rate of 9.00 g/10 minutes based on ASTM D1238 condition 190/2.16 that provides optimum performance in general purpose injection molding and extrusion of thin walled tubing and thin gauge film.

"Celcon®M50" means an acetal copolymer of intermediate grade having a density of 1410 Kg/m^3 and a DTUL@1.8 MPa of 97 degrees C. and a melt flow of 5 g/10 according to ASTM D1238 condition 190/2.16.

"Celcon® M15HP-00" means an unstabilized acetal copolymer having a density of 1400 Kg/m^3 and a melt flow rate of 1.5 g/10 minutes according to ASTM D1238 condition 190/2.16.

"Acetal terpolymer" means a polyoxymethylene polymer made from three monomers.

"Clorox®" means 6% sodium hypochlorite having a pH of 10.7.

"Colorfast" means maintaining color without running or fading.

"CNG" means a formaldehyde scavenger, Cyanoguanidine.

"Color stabilizer" means and includes compositions such as calcium citrate, calcium propionate and the like which promote colorfastness.

"Dicyandiamide" means generically Cyanoguanidine.

"Delamination" means surface decomposition of a degree greater than that seen on a pitted surface generally encompassing of at least about 1–2% of the surface area having been subjected to the Immersion Test. Delamination is observed visually and is illustrated in FIG. 4.

The "Dip Test" was developed to mimic a typical field experience for an injection molded part as described in the present invention. This Dip Test was utilized to measure any improvement in resistance to bleach, using a test procedure as follows: ISO test bars (5 bars per Example) were dipped 5 days, one dip per day for 20 seconds in bleach solution of Clorox® (6% sodium hypochlorite); no wiping off, no rinsing off. The solution runs down the test bars, dries and concentrates on the surface between dipping cycles and the test specimens are stored for 24 h in air at room temperature between applications. After dip completion, the specimens were stored for 9 days in air at room temperature then change in weight and in tensile strength were determined.

"Eurelon 975" means thermoplastic polyamide resin.

"El/Sucon" means DPDA-6182 NT Ethylene Copolymer, CaAcetate, Surlyn, Elvamide.

For the "Immersion Test", five tensile bars were prepared by injection-molding and immersed in Clorox® (6% sodium hypochlorite) approximately up to the middle of the bars. Every week the bars were removed from the jars, dried with a clean wipe, inspected for delamination and put back in the jars unless a significant amount of delamination was observed. Preferably, the bleach supply is consolidated so that it is uniform in comparative testing. A significant amount of delamination is determined when about 1–2% of the treated surface degrades by flaking or peeling as shown in FIG. 4. The number of weeks at which that delamination occurs is recorded as the delamination time.

"PEG" means polyethyleneglycol.

"Predominantly" means more than 50 mole percent based on the amount of the specified mixture. Calcium citrate is typically the predominant component of the color stabilizer mixture.

"Polyoxymethylene matrix polymer" means a polymer matrix formed substantially of formaldehyde derived repeat units; preferably 85 mole percent or more oxymethylene repeat units.

Typically, acetal homopolymers may be prepared by polymerizing anhydrous formaldehyde or trioxane. Oxymethylene homopolymers are typically stabilized against thermal degradation by end-capping with, for example, ester or ether groups, such as those derived from alkanoic anhydrides (e.g. acetic anhydride) or dialkyl ethers, (e.g. dimethyl ether) or by incorporating stabilizer compounds into the homopolymer. Commercially available acetal homopolymer is made by polymerizing anhydrous formaldehyde in the presence of an initiator after which the polymer is end-capped by acetylation of the hemiacetal end groups with acetic anhydride in the presence of sodium acetate catalyst. Methods for making end-capped acetal homopolymers are taught in U.S. Pat. Nos. 2,786,994 and 2,998,409.

Polyoxymethylene polymers which have been found to be especially suitable for use in the composition of the present invention are crystalline oxymethylene copolymers having repeat units which consist essentially of oxymethylene groups interspersed with oxy(higher alkylene) groups of the general formula:

wherein each $R_1$ and $R_2$ is hydrogen, a lower alkyl group, or a halogen substituted lower alkyl group, each $R_3$ is a methylene, oxymethylene, lower alkyl or haloalkyl substituted methylene or lower alkyl or haloalkyl substituted oxymethylene group, and n is zero or an integer from one to three, inclusive. Each lower alkyl group preferably contains one or two carbon atoms. Oxymethylene groups generally will constitute from about 85 to 99.9 percent of the recurring units in such copolymers and are generally incorporated by ring-opening polymerization of trioxane in the presence of an acidic catalyst. The oxy(higher alkylene) groups are incorporated into the polymer by copolymerizing a cyclic ether or cyclic formal having at least two adjacent carbon atoms in the ring in addition to trioxane. The cyclic ether or formal is incorporated by the breaking of an oxygen-to-carbon linkage. The preferred oxy(higher alkylene) group is oxyethylene, having the formula:

Oxyethylene may be incorporated into the polymer by copolymerization of ethylene oxide or 1,3-dioxolane with trioxane.

The preferred crystalline acetal copolymers, as described above which have a structure consisting essentially of oxymethylene and oxyethylene groups, are thermoplastic materials having a melting point of at least 150° C. They normally are millable or processable at temperatures ranging from about 175° C. to about 230° C. These copolymers are normally highly crystalline and exhibit a polymer crystallinity from about 40 percent to about 90 percent or greater.

Typically, oxymethylene copolymers are stabilized after manufactured by degradation of unstable molecular ends of the polymer chains to a point where a relatively stable carbon-to-carbon linkage prevents further degradation of each end of the polymer chain. Such degradation of unstable molecular ends is generally effected by hydrolysis, as disclosed, for example, in U.S. Pat. No. 3,219,623 to Berardinelli. Oxymethylene copolymer may also be stabilized by end-capping, again using techniques well known to those skilled in the art, as for example by acetylation with acetic anhydride in the presence of a sodium acetate catalyst.

A particularly preferred class of oxymethylene copolymers is commercially available under the trade name Celcon® acetal copolymer from Ticona of Hoechst Celanese Corporation, Summit, N.J. Celcon acetal copolymers typically are copolymers of about 98 weight percent of trioxane and about 2 percent of dioxolane. The compositions of the current invention may be made using any suitable grade of Celcon acetal, including Celcon grades M-50, M-90™, M270, M450, M140, M25 and M15HP.

Oxymethylene terpolymers may also be used in making the bleach resistant compositions of the present invention. These terpolymers contain oxymethylene groups, oxy (higher alkylene) groups such as those corresponding to the general formula:

and a different third group which has been interpolymerized with the oxymethylene and oxy(higher alkylene) groups. A terpolymer as described above is typically made by reacting trioxane with a cyclic ether or cyclic acetal and a third monomer which is a bifunctional compound, such as a diglycide of the formula:

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive, or an oxypoly(lower alkoxy) group, preferably one having from 2 to 4 recurring lower alkoxy groups each with 1 or 2 carbon atoms. Examples of suitable bifunctional compounds include the diglycidyl ethers of ethylene glycol, 1,2-propanediol, and 1,4-butanediol with the diglycidyl ether of 1,4-butanediol being preferred. Generally, when preparing such terpolymers, ratios of from 99.89 to 89.0 weight percent trioxane, 0.1 to 10 weight percent of the cyclic ether or cyclic acetal, and 0.01 to 1 weight percent of the bifunctional compound are preferred, based on the total weight of monomers used in forming the terpolymer. The oxymethylene-based terpolymers are made and stabilized by methods well known in the art, such as by the addition of antioxidants and formaldehyde and acid scavengers. More detailed descriptions of the methods for making oxymethylene-based terpolymers and their compositions can be found in previously cited patents.

These oxymethylene polymers may be combined in various proportions by melt blending in extruders or similar apparatus to form suitable polymers for preparation of the composition of the present invention. Generally, polyoxymethylene polymers are readily blended with stabilizers and processing aids when the polymer is in the molten state.

A fine particle, stearate coated calcium carbonate useful in the invention is characterized as exhibiting a particle size of about 0.6 $\mu$m, a surface area of about 7 $m^2$/gm, a bulk density of about 25 lb/ft$^3$, and a specific gravity of about 2.7. A preferred fine particle, stearate coated calcium carbonate is Super-Pflex®200 available from Specialty Minerals Inc. N.Y. N.Y. The hindered phenol useful in the present invention are generally known as antioxidants or free radical inhibitors. At least one of 2,2'-methylenebis(4-methyl-6-t-butylphenol), hexamethyleneglycol-bis(3,5-di-t-butyl-4-hydroxyhydrocinnamate), tetrabis>methylene(3,5-di-t-butyl-4-hydroxy-hydrocinnamate)methane, triethyleneglycol-bis-3-(3-t-butyl-4-hydroxy-5-methylphenyl)propionate, 1,3,5-trimethyl-2,4,6-tris(3,5-di-t-butyl-4-hydroxy-benzyl)-benzene, p-octadecyl-3-(4'-hydroxy-3',5'-di-t-butyl-phenol)propionate, 4,4'-methylenebis(2,6-di-t-butyl-phenol), 4,4'-butylidene-bis-(6-t-butyl-3-methylphenol), 2,2'-thiodiethyl-bis[[>]]-3-(3,5-di-t-butyl-4-hydroxyphenol)propionate, di-stearyl-3,5-di-t-butyl-4-hydroxybenzylphosphonate and 2-t-butyl-6-(3-t-butyl-5-methyl-2-hydroxybenzyl)-4-methylphenylacrylate may be used. However, the useful hindered phenols are not limited to these compounds. Other hindered or stereo-obstructing phenols of the same kind as the above described ones are effective. Of these, hexamethyleneglycol-bis(3,5-di-t-butyl-4-hydroxyhydro-cinnamate), for example Irganox®259 available from Ciba-Geigy, tetrakis[methylene(3, 5-di-t-butyl-4-hydroxyhydrocinnamate)]-methane, for example, Irganox 1010 made by Ciba-Geigy and triethyleneglycol-bis-3-(3-t-butyl-4-hydroxy-5-methylphenyl)propionate, for example, Irganox 245 made by Ciba-Geigy are effective. A preferred hindered phenol is Irganox 245, triethyleneglycol-bis-3-(3-t-butyl-4-hydroxy-5-methylphenyl).

The present invention relates in one aspect to a molding composition exhibiting bleach resistance comprising a polyoxymethylene matrix polymer, from about 0.5 to about 10, more preferably from about 0.5 to about 2.0 and still more preferably from about 0.5 to about 1.5 weight percent of a bleach stabilizer selected from alkali metal or alkaline earth element carbonates or phosphates and mixtures thereof dispersed in the matrix resin and a bleach co-stabilizer selected from the group consisting of: (a) a poly(alkoxy) stabilizer; (b) a zinc oxide stabilizer; (c) a color stabilizer consisting of a mixture of calcium citrate and calcium propionate, wherein the calcium citrate is the predominant component of the stabilizer mixture; or (d) mixtures of two or more of (a), (b) and (c); and wherein the composition exhibits a bleach resistance index of at least 2.0, more preferably exhibits a bleach resistance index of at least 2.5 and still more preferably exhibits a bleach resistance index of at least 3.0.

The present invention relates in another aspect to a molding composition wherein the polyoxymethylene is selected from the group consisting of: (a) oxymethylene homopolymers; (b) oxymethylene copolymers comprising about 90 to about 99.9 percent oxymethylene repeat units interspersed with repeat units of the formula:

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals, and n is an integer from 0 to 3, inclusive; (c) oxymethylene terpolmers, which are the reaction product of trioxane and, a cyclic ether and/or a cyclic acetal, and a diglycidyl ether crosslinker of the formula:

wherein Z is selected from the group consisting of a carbon-to-carbon bond, oxygen, an oxyalkoxy unit of 1 to 8 carbon atoms, and an oxypoly(lower alkoxy) unit; and (d) mixtures of (a), (b) and (c).

Still another aspect of the present invention relates to a molding composition wherein (a) the polyoxymethylene is selected from the group consisting of oxymethylene copolymers comprising about 90 to about 99.9 percent oxymethylene repeat units interspersed with repeat units derived from ethylene oxide or 1,3 dioxolane.

A preferred embodiment of the present invention is a composition comprised of from about 94.0 to 99.9 weight percent of a polyoxymethylene copolymer and from about 0.01 to 0.1 weight percent of a color stabilizer wherein (a) the bleach stabilizer is selected from the group comprising: calcium carbonate, sodium carbonate, potassium carbonate and barium carbonate but is most preferably calcium carbonate, (b) at least one hindered phenol, present in an amount of about 0.25–1.0 weight %, is added and such hindered phenol is selected from the group comprising: hexamethyleneglycol-bis(3,5-di-t-butyl-4-hydroxyhydrocinnamate), 2,2'-methylenebis(4-methyl-6-t-butylphenol), hexamethyleneglycol-bis(3,5-di-t-butyl-4-hydroxyhydro-cinnamate), tetrabis[methylene(3,5-di-t-butyl-4-hydroxyhydro-cinnamate)]-methane, triethyleneglycol-bis-3-(3-t-butyl-4-hydroxy-5-methylphenyl)propionate, 1,3,5-trimethyl-2,4,6-tris(3,5-di-t-butyl-4-hydroxy-benzyl)-benzene, p-octadecyl-3-(4'-hydroxy-3',5'-di-t-butyl-phenol)propionate, 4,4'-methylenebis(2,6-di-t-butylphenol), 4,4'-butylidene-bis-(6-t-butyl-3-methylphenol), 2,2'-thiodiethyl-bis-(3,5-di-t-butyl-4-hydroxyphenol)propionate, di-stearyl-3,5-di-t-butyl-4-hydroxybenzylphosphonate and 2-t-butyl-6-(3-t-butyl-5-methyl-2-hydroxybenzyl)-4-methylphenylacrylate, hexamethyleneglycol-bis(3,5-di-t-butyl-4-hydroxyhydrocinnamate), tetrakis[methylene(3,5-di-t-butyl-4-hydroxyhydrocinnamate)] methane and triethyleneglycol-bis-3-(3-t-butyl-4-hydroxy-5-methylphenyl)propionate, but most preferably is the combination of hexamethyleneglycol-bis(3,5-di-t-butyl-4-hydroxy-hydrocinnamate) and triethyleneglycol-bis-3-(3-t-butyl-4-hydroxy-5-methylphenyl)propionate and (c) the composition exhibits a bleach resistance index of at least 2.0, more preferably exhibits a bleach resistance index of at least 2.5 and still more preferably exhibits a bleach resistance index of at least 3.0.

Another preferred embodiment of the present invention is an injection molded part adapted for interfacing aqueous bleach prepared from a composition comprising a polyoxymethylene matrix polymer, from about 0.5 to about 10 weight percent, more preferably from about 0.5 to about 2.0 weight percent and still more preferably from about 0.5 to about 1.5 weight percent of a bleach stabilizer selected from alkali metal or alkaline earth element carbonates or phosphates and mixtures thereof dispersed in the matrix resin.

Still yet another preferred embodiment of the present invention is an injection molded part adapted for interfacing aqueous bleach wherein the bleach stabilizer is selected from the group comprising: calcium carbonate, sodium carbonate, potassium carbonate and barium carbonate.

Still yet another particularly preferred embodiment of the present invention is an injection molded part adapted for interfacing aqueous bleach further comprising a bleach co-stabilizer selected from the group consisting of: (a) a poly(alkoxy) stabilizer; (b) a zinc oxide stabilizer; (c) a color stabilizer consisting of a mixture of calcium citrate and calcium propionate, wherein the calcium citrate is the predominant component of the stabilizer mixture; (d) mixtures of two or more of (a), (b) and (c); (e) at least one hindered phenol selected from the group comprising: hexamethyleneglycol-bis(3,5-di-t-butyl-4-hydroxyhydrocinnamate), 2,2'-methylenebis(4-methyl-6-t-butylphenol), hexamethyleneglycol-bis(3,5-di-t-butyl-4-hydroxyhydrocinnamate), tetrabis[methylene(3,5-di-t-butyl-4-hydroxyhydrocinnamate)]methane, triethyleneglycol-bis-3-(3-t-butyl-4-hydroxy-5-methylphenyl)propionate, 1,3,5-trimethyl-2,4,6-tris(3,5-di-t-butyl-4-hydroxy-benzyl)-benzene, p-octadecyl-3-(4'-hydroxy-3',5'-di-t-butyl-phenol)propionate, 4,4'-methylenebis(2,6-di-t-butylphenol), 4,4'-butylidene-bis-(6-t-butyl-3-methylphenol), 2,2'-thiodiethyl-bis>3-(3,5-di-t-butyl-4-hydroxyphenol)propionate, di-stearyl-3,5-di-t-butyl-4-hydroxybenzylphosphonate and 2-t-butyl-6-(3-t-butyl-5-methyl-2-hydroxybenzyl)-4-methylphenylacrylate, hexamethyleneglycol-bis(3,5-di-t-butyl-4-hydroxyhydrocinnamate), tetrakis[methylene(3,5-di-t-butyl-4-hydroxyhydrocinnamate)]methane and triethyleneglycol-bis-3-(3-t-butyl-4-hydroxy-5-methylphenyl)propionate, but most preferably is the combination of hexamethyleneglycol-bis(3,5-di-t-butyl-4-hydroxyhydrocinnamate) and triethyleneglycol-bis-3-(3-t-butyl-4-hydroxy-5-methylphenyl)propionate; and wherein the composition exhibits a bleach resistance index of at least 2.0, more preferably exhibits a bleach resistance index of at least 2.5 and yet still more preferably exhibits a bleach resistance index of at least 3.0.

In many preferred cases the injection molded part adapted for interfacing aqueous bleach is selected from the group consisting of: housing components, washers, bearings, valves, gears, impellers, jets, fittings, nozzles, elbows, detergent baskets, grommets, flanges, tumblers, pump components, blades, shafts, conduits and the like.

Another particularly preferred embodiment of the present invention is a method of using the injection molded part comprising contacting the part with an aqueous medium containing a bleaching agent.

The following examples are general illustrations of methods for preparing the polymeric composition of the invention. They are provided for purposes of exemplification only, and should be appreciated from the foregoing discussion.

To prepare the compositions herein, the components are tumbled in a barrel followed by high speed mixing for 30 sec. in a Henschel mixer to form a mixture. The mixture is fed into a Werner and Pfleiderer twin screw ZSK extruder and extruded into strands. The extruder zones are operated anywhere from about 370° to 390° F. The melt temperature is about 415° F. and under a vacuum of about 27–30 in. Hg, and the screw speed is about 150 rpm. Thereafter, the strands are quenched in cold water and cut into pellets. The pellets are injection molded into parts and test specimens at conventional pressure, velocity and cycle time settings, for example, at a nozzle temperature setting of about 360° to about 420° F., and a barrel temperature setting of about 350° to about 420° F.

EXAMPLE 1

Compositions and delamination times are given immediately below.

In a first example, a polyoxymethylene molding resin comprising 1 wt. % calcium carbonate, a bleach co-stablizer and a hindered phenol, was prepared, molded and tested using the procedures detailed above and the following components:

Components:
(a) 97.7 wt. % of M90-00
(b) 0.5 wt. % of Irganox 259
(c) 0.1 wt. % of Dicyandiamide
(d) 1.0 wt. % Calcium carbonate
(e) 0.5 wt. % of Acetal terpolymer
(f) 0.2 wt. % of Acrawax
Delamination Time: 12 weeks to delamination

EXAMPLE 2

In another example, a polyoxymethylene molding resin comprising 2 wt. % calcium carbonate, a bleach co-stabilizer and a hindered phenol, was prepared, molded and tested using the procedures detailed above and the following components:

Components:
(a) 94.7 wt. % of M90-00
(b) 0.5 wt. % of Irganox 259
(c) 0.1 wt. % of Dicyandiamide
(d) 2.0 wt. % Calcium carbonate
(e) 2.0 wt. % PEG 35000
(f) 0.5 wt. % of Acetal terpolymer
(g) 0.2 wt. % of Acrawax
Delamination Time: 12 weeks to delamination

EXAMPLE 3

In another example, a polyoxymethylene molding resin comprising 0.5 wt. % calcium carbonate, a bleach co-stabilizer and a hindered phenol, was prepared, molded and tested using the procedures detailed above and the following components:

Components:
(a) 98.7 wt. % of M50-00
(b) 0.5 wt. % of Irganox 245
(c) 0.08 wt. % of Tricalcium citrate
(d) 0.02 wt. % Calcium propionate
(e) 0.5 wt. % Calcium carbonate
(f) 0.2 wt. % of Acrawax
Delamination Time: 13 weeks to delamination

EXAMPLE 4

In another example, a polyoxymethylene molding resin comprising 1 wt. % calcium carbonate, a bleach co-stabilizer and a hindered phenol, was prepared, molded and tested using the procedures detailed above and the following components:

Components:
(a) 98.2 wt. % of M50-00
(b) 0.5 wt. % of Irganox 245
(c) 0.08 wt. % of Tricalcium citrate
(d) 0.02 wt. % Calcium propionate
(e) 1.0 wt. % Calcium carbonate
(f) 0.2 wt. % of Acrawax
Delamination Time: 12 weeks to delamination

COMPARATIVE EXAMPLE A

To prepare a comparative blend of a polyoxymethylene molding resin, a composition was prepared, molded and tested using the procedures detailed above and the following components:

Components:
(a) 98.5 wt. % of M90-00
(b) 0.35 wt. % of Irganox 259
(c) 0.15 wt. % El/Sucon
(d) 0.0 wt. % calcium carbonate
(e) 0.5 wt. % of acetal terpolymer
(f) 0.5 wt. % of Acrawax C
Delamination Time: 3 weeks to delamination

COMPARATIVE EXAMPLE B

To prepare a comparative blend of a polyoxymethylene molding resin, a composition was prepared, molded and tested using the procedures detailed above and the following components:

Components:
(a) 98.5 wt. % of M15HP-00
(b) 0.5 wt. % of Irganox 245
(c) 0.5 wt. % titanium diodixe
(d) 0.0 wt. % calcium carbonate
(e) 0.5 wt. % of Acrawax C
Delamination Time: 2 weeks to delamination

COMPARATIVE EXAMPLE C

In another comparative example, a polyoxymethylene molding resin was prepared, molded and tested using the procedures detailed above and the following components:

Components:
(a) 95.59 wt. % of M15HP-00
(b) 0.3 wt. % of Irganox 245

(c) 0.0 wt. % calcium carbonate
(d) 0.05 wt % of Melamine
(e) 0.01 wt % of Tricalcium citrate
(f) 0.05 wt. % of Eurelon 975
(g) 1.0 wt % of Zinc Oxide
(h) 2.0 wt % of PEG 35000
(i) 0.5 wt. % Acetal terpolymer
(j) 0.5 wt % of Acrawax C
Delamination Time: 3 weeks to delamination

COMPARATIVE EXAMPLE D

In another comparative example, a polyoxymethylene molding resin was prepared, molded and tested using the procedures detailed above and the following components:

Components:
(a) 95.39 wt. % of M15HP-00
(b) 0.5 wt. % of Irganox 245
(c) 0.0 wt. % calcium carbonate
(d) 0.05 wt % of Melamine
(e) 0.01 wt % of Tricalcium citrate
(f) 0.05 wt. % of Eurelon 975
(g) 1.0 wt % of Zinc Oxide
(h) 2.0 wt % of PEG 35000
(i) 0.5 wt. % Acetal terpolymer
(j) 0.5 wt % of Acrawax C
Delamination Time: 5 weeks to delamination

COMPARATIVE EXAMPLE E

In another comparative example, a polyoxymethylene molding resin was prepared, molded and tested using the procedures detailed above and the following components:

Components:
(a) 95.39 wt. % of M15HP-00
(b) 0.5 wt. % of Irganox 245
(c) 0.0 wt. % calcium carbonate
(d) 0.05 wt % of Melamine
(e) 0.05 wt. % of Eurelon 975
(f) 0.01 wt. % Calcium 12 Hydroxy Stearate
(g) 1.0 wt % of Zinc Oxide
(h) 2.0 wt % of PEG 35000
(i) 0.5 wt. % Acetal terpolymer
(j) 0.5 wt % of Acrawax C
Delamination Time: 2 weeks to delamination

COMPARATIVE EXAMPLE F

In another example, a polyoxymethylene molding resin was prepared, molded and tested using the procedures detailed above and the following components:

Components:
(a) 95.39 wt. % of M90-00
(b) 0.5 wt. % of Irganox 245
(c) 0.0 wt. % calcium carbonate
(d) 0.05 wt % of Melamine
(e) 0.05 wt. % of Eurelon 975
(f) 0.01 wt. % Calcium 12 Hydroxy Stearate
(g) 1.0 wt % of Zinc Oxide
(h) 2.0 wt % of PEG 35000
(i) 0.5 wt. % of Acetal terpolymer
(j) 0.5 wt. % of Acrawax
Delamination Time: 4 weeks to delamination

COMPARATIVE EXAMPLE G

In another example, a polyoxymethylene molding resin was prepared, molded and tested using the procedures detailed above and the following components:

Components:
(a) 95.39 wt. % of M50-00
(b) 0.5 wt. % of Irganox 245
(c) 0.0 wt. % calcium carbonate
(d) 0.05 wt % of Melamine
(e) 0.05 wt. % of Eurelon 975
(f) 0.01 wt. % Calcium 12 Hydroxy Stearate
(g) 1.0 wt % of Zinc Oxide
(h) 2.0 wt % of PEG 35000
(i) 0.5 wt. % of Acetal terpolymer
(j) 0.5 wt. % of Acrawax
Delamination Time: 3 weeks to delamination

Comparative Example H

In another example, a polyoxymethylene molding resin was prepared, molded and tested using the procedures detailed above and the following components:

Components:
(a) 95.39 wt. % of M50-00
(b) 0.5 wt. % of Irganox 259
(c) 0.0 wt. % calcium carbonate
(d) 0.05 wt % of Melamine
(e) 0.05 wt. % of Eurelon 975
(f) 0.01 wt. % Calcium 12 Hydroxy Stearate
(g) 1.0 wt % of Zinc Oxide
(h) 2.0 wt % of PEG 35000
(i) 0.5 wt. % of Acetal terpolymer
(j) 0.5 wt. % of Acrawax
Delamination Time: 2 weeks to delamination

COMPARATIVE EXAMPLE AA

In another example, a polyoxymethylene molding resin was prepared, molded and tested using the procedures detailed above and the following components:

Components:
(a) 99.2 wt. % of M90-00
(b) 0.5 wt. % of Irganox 245
(c) 0.08 wt. % of Tricalcium citrate
(d) 0.02 wt. % Calcium propionate
(e) 0.0 wt. % Calcium carbonate
(f) 0.2 wt. % of Acrawax
Delamination Time: 5 weeks to delamination The data from the above Examples and Comparative Examples is summarized in Table 1 below. Additionally summarized are physical properties of the compositions.

TABLE 1

Bleach Resistance of Examples and Comparative Examples

| INGREDIENTS | Ex. A | Ex. B | Ex. C | Ex. D | Ex. E | Ex. F | Ex. G | Ex. H | Ex. AA | Ex. 1 | Ex. 2 | Ex. 3 | Ex. 4 |
|---|---|---|---|---|---|---|---|---|---|---|---|---|---|
| M50-00 | | | | | | | 95.39 | 95.39 | | | | 98.7 | 98.2 |
| M90-00 | 98.5 | | | | | 95.39 | | | 99.2 | 97.7 | 94.7 | | |
| M15HP-00 | | 98.5 | 95.59 | 95.39 | 95.39 | | | | | | | | |
| Irganox 245 | | 0.5 | 0.3 | 0.5 | 0.5 | 0.5 | 0.5 | | 0.5 | | | 0.5 | 0.5 |
| Irganox 259 | 0.35 | | | | | | | 0.5 | | 0.5 | 0.5 | | |
| Melamine | | | 0.05 | 0.05 | 0.05 | 0.05 | 0.05 | 0.05 | | | | | |
| Tricalcium citrate | | | 0.01 | 0.01 | | | | | 0.08 | | | 0.08 | 0.08 |
| Calcium propionate | | | | | | | | | 0.02 | | | 0.02 | 0.02 |
| Eurelon 975 | | | 0.05 | 0.05 | 0.05 | 0.05 | 0.05 | 0.05 | | | | | |
| El/Sucon | 0.15 | | | | | | | | | | | | |
| Ca 12 Hydroxy Stearate | | | | | 0.01 | 0.01 | 0.01 | 0.01 | | | | | |
| CNG | | | | | | | | | | 0.1 | 0.1 | | |
| Zinc Oxide | | | 1 | 1 | 1 | 1 | 1 | 1 | | | | | |
| Titanium Dioxide | | 0.5 | | | | | | | | | | | |
| Super-Pflex 200 (CaCO3) | | | | | | | | | | 1 | 2 | 0.5 | 1 |
| PEG 35000 | | | 2 | 2 | 2 | 2 | 2 | 2 | | | 2 | | |
| Acetal terpolymer | 0.5 | | 0.5 | 0.5 | 0.5 | 0.5 | 0.5 | 0.5 | | 0.5 | 0.5 | | |
| Acrawax C Pentaerithritol tetrastearate | 0.5 | 0.5 | 0.5 | 0.5 | 0.5 | 0.5 | 0.5 | 0.5 | 0.2 | 0.2 | 0.2 | 0.2 | 0.2 |
| Notched Izod Strength | | | | | | | | | 6.3 | 6.2 | | 7.1 | 7.1 |
| Charpy Notched Strength | | | | | | | | | 7.8 | 6.6 | | 7.4 | 7.4 |
| Yield Stress (Mpa) | | | | | | | | | | | | 63.9 | 63.9 |
| Sec. Mod. (Mpa) | | | | | | | | | | | | 2650 | 2670 |
| Density (g/cc) | | | | | | | | | | | | 1.411 | 1.413 |
| Change in TS after Dip | | | | | | | | | | | | −0.5 | −1.5 |
| Weight Change after Dip | | | | | | | | | | | | −0.5 | −0.3 |
| Weeks to Delamination | 3 | 2 | 3 | 5 | 2 | 4 | 3 | 2 | 5 | 12 | 12 | 13 | 12 |
| Color L (+=white) | | | | | | | | | | | | 72 | 74 |
| L aged | | | | | | | | | | | | 90 | 90 |
| Color b (+=yellow) | | | | | | | | | | | | −1.5 | −0.6 |
| b aged | | | | | | | | | | | | 1.6 | 1.4 |
| Color a (+=red) | | | | | | | | | | | | −1.7 | −1.7 |
| a aged | | | | | | | | | | | | −1.3 | −1.2 |

Figure 1:
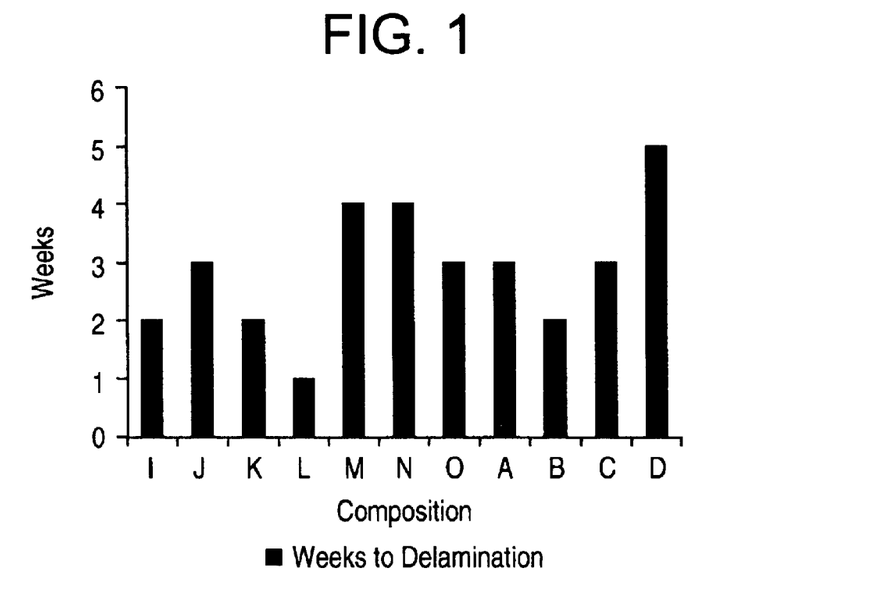
FIGS. 1, 2 and 3 are bar charts illustrating bleach resistance of various polyoxymethylene compositions.

Table 2 provides additional information and formulations of the compositions tested by way of the Immersion Test. Bleach resistance results are seen in FIG. 1. The last two formulations, Examples C and D both are M15HP-00 based materials containing 1% Zinc Oxide, 2% PEG 35000 and identical stabilization packages except that the Example D has an increased level of Irganox 245 (up to 0.5% from 0.3% in the Example C). The original testing, (various batches of bleach and parts) showed best results with Example D.

TABLE 2

| COMPOSITION | Ex. I (%) | Ex. J (%) | Ex. K (%) | Ex. L (%) | Ex. M (%) | Ex. N (%) | Ex. O (%) | Ex. A (%) | Ex. B (%) | Ex. C (%) | Ex. D (%) |
|---|---|---|---|---|---|---|---|---|---|---|---|
| M50-00 | | | | | | | | | | | |
| M90-00 | 98.7 | | | | | | | 98.8 | 98.5 | | |
| C 1300-00 Low Common | | | 95.8 | | | | | | | | |
| M90UP | | 96.18 | | | | | | | | | |
| M15HP-00 | | | | 98.8 | | | | | | 98.5 | 95.59 | 95.39 |
| Low Common MI 3 | | | | | | 98.51 | | | | | |

TABLE 2-continued

| | Ex. I (%) | Ex. J (%) | Ex. K (%) | Ex. L (%) | Ex. M (%) | Ex. N (%) | Ex. O (%) | Ex. A (%) | Ex. B (%) | Ex. C (%) | Ex. D (%) |
|---|---|---|---|---|---|---|---|---|---|---|---|
| Low Common MI 13 | | | | | | 98.83 | | | | | |
| Low Common MI 10 | | | | | | | | | | | |
| Irganox 245 | | 0.5 | 0.3 | | 0.51 | 0.31 | | | 0.5 | 0.3 | 0.5 |
| Irganox 259 | 0.5 | | | 0.35 | | | 0.35 | 0.35 | | | |
| Melamine | | 0.07 | 0.05 | | | | | | | 0.05 | 0.05 |
| Glyceryl Monosterate | | 0.25 | | | | | | | | | |
| Tricalcium citrate | | | 0.1 | | | | | | | 0.01 | 0.01 |
| Eurelon 975 | | | 0.05 | | | | | | | 0.05 | 0.05 |
| E1/Sucon | | | | 0.15 | | | 0.15 | 0.15 | | | |
| Calcium 12 Hydroxy Stearate | 0.1 | | | | | | | | | | |
| Calcium Citrate | | | | | | | | | | | |
| Dicyandiamide | | | | | | | | | | | |
| Zinc oxide | | 1 | 1 | | | | | | | 1 | 1 |
| Titanium dioxide | | | | | 0.5 | 0.5 | | | 0.5 | | |
| Mg(OH)2 | | | | | | | | | | | |
| Super-Pflex 200 | | | | | | | | | | | |
| Carbowax 8000 | | | | | | | | | | | |
| PEG 6000 | | 2 | | | | | | | | | |
| PEG 35000 | | | 2 | | | | | | | 2 | 2 |
| Terpolymer | | | 0.5 | | | | | | | | |
| Acetal terpolymer | 0.5 | | 0.5 | | | 0.5 | 0.5 | | | 0.5 | 0.5 |
| Licowax C | | | 0.2 | | | | | | | | |
| Acrawax C | 0.2 | | 0.2 | 0.48 | | 0.2 | 0.5 | 0.5 | 0.5 | 0.5 | |
| Unknown Amide | | | | | | 0.36 | | | | | |
| Pentaerithritol tetrastearate | | | | | | | | | | | |
| Weeks to Delamination | 2 | 3 | 2 | 1 | 4 | 4 | 3 | 3 | 2 | 3 | 5 |

The formulations in Table 3 were subjected to the Immersion Test to determine the effects of the level of Zinc Oxide and changes in the stabilization package. As seen in Table 3, Example P delaminated in two weeks. Examples Q–T performed poorly and only lasted four weeks before delamination occurred.

TABLE 3

Comparative Formulations

| | Example P (%) | Example Q (%) | Example R (%) | Example S (%) | Example T (%) |
|---|---|---|---|---|---|
| M50-00 | | | | | |
| M90-00 | 98.5 | 95.39 | 95.08 | 94.58 | 94.58 |
| C 1300-00 Low Common | | | | | |
| M90UP | | | | | |
| M15HP-00 | | | | | |
| Low Common MI 3 | | | | | |
| Low Common MI 13 | | | | | |
| Low Common MI 10 | | | | | |
| Irganox 245 | | 0.5 | 0.5 | 0.5 | 0.5 |
| Irganox 259 | | | | | |
| Melamine | | 0.07 | 0.07 | 0.07 | 0.07 |
| Glyceryl Monostearate | | | 0.25 | 0.25 | 0.25 |
| Tricalcium citrate | | | | | |
| Eurelon 975 | | 0.05 | | | |
| E1/Sucon | | | | | |
| Calcium 12 Hydroxy Stearate | | | 0.1 | 0.1 | 0.1 |
| Calcium Citrate | | 0.01 | | | |
| Dicyandiamide | | | | | |
| Zinc oxide | 0.5 | 1 | 1.5 | 2 | 1 |
| Titanium dioxide | | | | | |
| Mg(OH)2 | | 2 | 2 | 2 | 2 |
| Super-Pflex 200 | | | | | |
| Carbowax 8000 | | | | | |
| PEG 6000 | | | | | |
| PEG 35000 | | | | | |
| Terpolymer | | | | | |
| Acetal terpolymer | | 0.5 | 0.5 | 0.5 | 0.5 |
| Licowax C | | | | | |
| Acrawax C | | | | | |
| Unknown Amide | | | | | |
| Pentaerithritol tetrastearate | | | | | |
| Weeks to Delamination | 2 | 4 | 4 | 4 | 4 |

Examples E, F V and W were compared to determine the effects of Irganox 259 versus Irganox 245 in both an M90-00 and M15HP base. Complete formulations are given in Table 4. Various commercial grades were included in the study with the single batch of bleach also. Visual weekly inspection for delamination yielded the results below and in FIG. 2:

TABLE 4

| | COMPOSITION | | | | | | | | | | | | | | | |
|---|---|---|---|---|---|---|---|---|---|---|---|---|---|---|---|---|
| | Ex. U (%) | Ex. M (%) | Ex. N (%) | Ex. B (%) | Ex. K (%) | Ex. E (%) | Ex. F (%) | Ex. V (%) | Ex. W (%) | Ex. G (%) | Ex. H (%) | Ex. I (%) | Ex. J (%) | Ex. X (%) | Ex. 5 (%) | Ex. 6 (%) |
| M50-00 | | | | | | | | | | 95.39 | 95.39 | | | | | |
| M90-00 | 98.8 | | | | | | 95.39 | | 95.39 | | | | 98.7 | 73.862 | 88.735 | 96.7 |
| C 1300-00 Low Common | | | | | 95.8 | | | | | | | | | | | |
| M90UP | | | | | | | | | | | | 96.18 | | | | |
| M15HP-00 | | | | 98.5 | | 95.39 | | 95.39 | | | | | | | | |
| Low Common MI 3 | | 98.51 | | | | | | | | | | | | | | |
| Low Common MI 13 | | | 98.83 | | | | | | | | | | | | | |
| Low Common MI 10 | | | | | | | | | | | | | | | | |
| Irganox 245 | | 0.51 | 0.31 | 0.5 | 0.3 | 0.5 | 0.5 | | | 0.5 | | | 0.5 | | | |
| Irganox 259 | 0.35 | | | | | | | 0.5 | 0.5 | | 0.5 | 0.5 | | 0.5 | 0.5 | 0.5 |
| Melamine | | | | | 0.05 | 0.05 | 0.05 | 0.05 | 0.05 | 0.05 | 0.05 | | 0.07 | | | |
| Glyceryl Monostearate | | | | | | | | | | | | | 0.25 | | | |
| Tricalcium citrate | | | | | 0.1 | | | | | | | | | | | |
| Eurelon 975 | | | | | 0.05 | 0.05 | 0.05 | 0.05 | 0.05 | 0.05 | 0.05 | | | | | |
| El/Sucon | 0.15 | | | | | | | | | | | | | 0.113 | 0.135 | |
| Calcium 12 Hydroxy Stearate | | | | | | 0.01 | 0.01 | 0.01 | 0.01 | 0.01 | 0.01 | 0.1 | | | | |
| Calcium Citrate | | | | | | | | | | | | | | | | |
| Dicyandiamide | | | | | | | | | | | | | | | | 0.1 |
| Zinc oxide | | | | | 1 | 1 | 1 | 1 | 1 | 1 | 1 | | 1 | | | |
| Titanium dioxide | | 0.5 | 0.5 | 0.5 | | | | | | | | | | | | |
| Mg(OH)2 | | | | | | | | | | | | | | | | |
| Super-Pflex 200 (CaCO3) | | | | | | | | | | | | | | 25 | 10 | 2 |
| Carbowax 8000 | | | | | | | | | | | | | | | | |
| PEG 6000 | | | | | | | | | | | | | 2 | | | |
| PEG 35000 | | | | | | 2 | 2 | 2 | 2 | 2 | 2 | 2 | | | | |
| Terpolymer | | | | | 0.5 | | | | | | | | | | | |
| Acetal terpolymer | 0.5 | | | | | 0.5 | 0.5 | 0.5 | 0.5 | 0.5 | 0.5 | 0.5 | | 0.375 | 0.45 | 0.5 |
| Licowax C | | | | | 0.2 | | | | | | | | | | | |
| Acrawax C | 0.2 | 0.48 | | 0.5 | | 0.5 | 0.5 | 0.5 | 0.5 | 0.5 | 0.5 | 0.2 | | 0.15 | 0.18 | 0.2 |
| Unknown Amide | | | 0.36 | | | | | | | | | | | | | |
| Pentaerithritol tetrastearate | | | | | | | | | | | | | | | | |
| Weeks to Delamination | 2 | 4 | 4 | 2 | 2 | 2 | 4 | 3 | 4 | 3 | 2 | 4 | 3 | 2 | 5 | 8 |
| Change in TS after Dip Test | | | | | | | | | | | | | | | | |
| Wt Change after Dip Test | | | | | | | | | | | | | | | | |
| Notched Izod | | | | | | | | | | | | | | | | |
| Notched Charpy | | | | | | | | | | | | | | | | |
| Yield Stress (Mpa) | | | | | | | | | | | | | | | | |
| Sec. Mod. (Mpa) | | | | | | | | | | | | | | | | |
| Density (g/cc) | | | | | | | | | | | | | | | | |

The following is noted:
Two commercial grades, Example I and Example U exhibited delamination times of 4 weeks and 2 weeks respectively.
Example 6, a commercial grade, delaminated in 8 weeks
Example 5, a commercial grade, delaminated in 5 weeks
Other commercial grades, such as Example K, only delaminated in 2 weeks
An M90 based Example F, delaminated in 4 weeks
An M15HP version, Example E, delaminated in 2 weeks.

The pH of the solution was also monitored weekly and dropped from the initial value of ~10.7 down to approximately 7 when delamination occurred.

Figure 2:
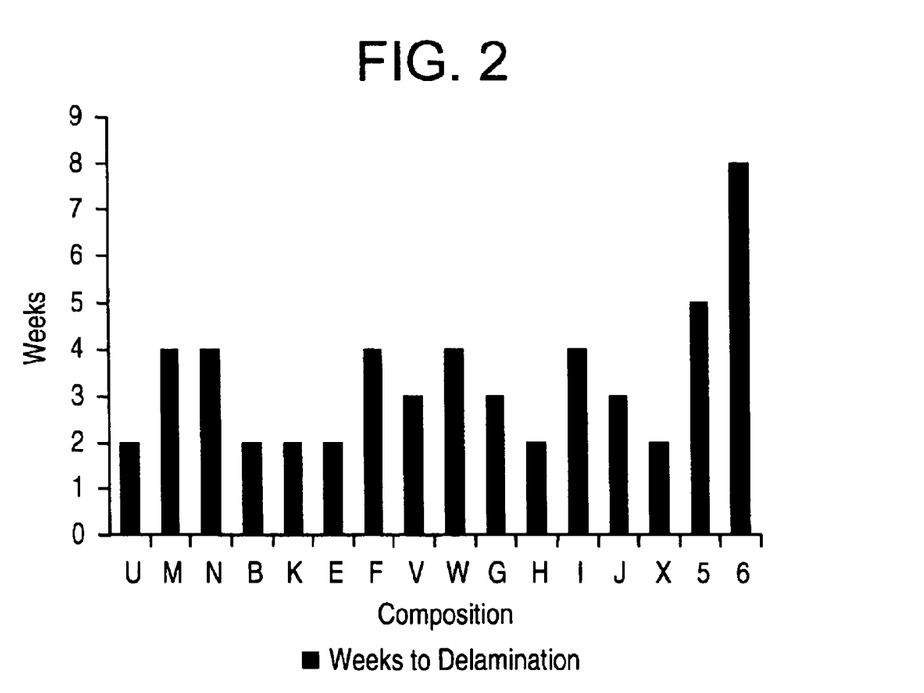
Figure 3:
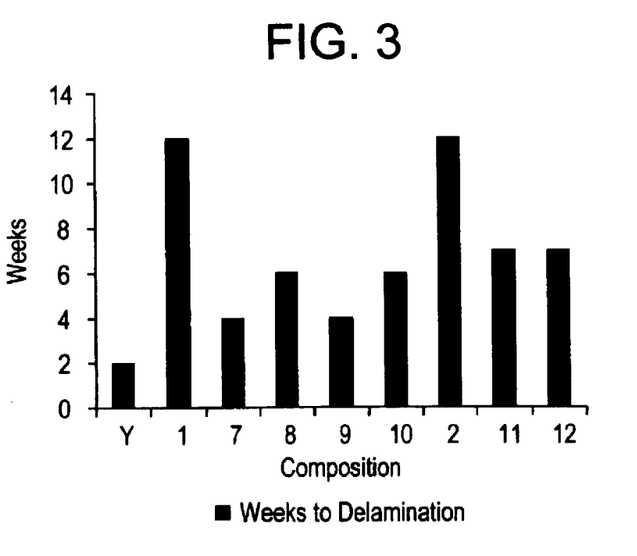

Example 6, a commercial grade, having 2% $CaCO_3$, significantly improved the length of time in complete bleach immersion before delamination occurred (see FIG. 2). The unexpected bleach resistance seen with the calcium carbonate containing formulation was further refined as seen below. Experimental runs using Examples 1, 7, 8 and 9 were produced to evaluate the effectiveness of loading level of $CaCO_3$. Additional runs were also included to see the effects of adding Zinc Oxide and/or PEG as found in Examples J and K. Formulations for Examples 1, 7, 8 and 9 can be found in Table 5. Results are shown graphically in FIG. 3. Examples 1 and 2 both showed excellent improvement to 12 weeks in the time to delamination upon continuous immersion in bleach, as compared to two weeks for the control, Example Y. Example 1 utilized 1% $CaCO_3$ while Example 2 utilized 2% $CaCO_3$ and 2% PEG 35000. Impact properties of Examples 1 and 2 were evaluated with results shown in Table 8.

TABLE 5

| | COMPOSITION | | | | | | | | |
|---|---|---|---|---|---|---|---|---|---|
| | Ex. Y (%) | Ex. 1 (%) | Ex. 7 (%) | Ex. 8 (%) | Ex. 9 (%) | Ex. 10 (%) | Ex. 2 (%) | Ex. 11 (%) | Ex. 12 (%) |
| M50-00 | | | | | | | | | |
| M90-00 | 98.7 | 97.7 | 96.7 | 93.7 | 88.7 | 95.7 | 94.7 | 96.7 | 96.7 |
| C 1300-00 Low Common | | | | | | | | | |
| M90UP | | | | | | | | | |
| M15HP-00 Low Common | | | | | | | | | |
| MI 3 Low Common | | | | | | | | | |
| MI 13 Low Common | | | | | | | | | |
| MI 10 | | | | | | | | | |
| Irganox 245 | | | | | | | | | |
| Irganox 259 | 0.5 | 0.5 | 0.5 | 0.5 | 0.5 | 0.5 | 0.5 | 0.5 | 0.5 |
| Melamine | | | | | | | | | |
| Glyceryl Monostearate | | | | | | | | | |
| Tricalcium citrate | | | | | | | | | |
| Eurelon 975 | | | | | | | | | |
| El/Sucon Calcium 12 Hydroxy Stearate | | | | | | | | 0.1 | |
| Calcium Citrate | | | | | | | | | |
| Dicyandiamide | 0.1 | 0.1 | 0.1 | 0.1 | 0.1 | 0.1 | 0.1 | | 0.1 |
| Zinc oxide | | | | | | | | | |
| Titanium dioxide | | | | | | | | | |
| Mg(OH)2 | | | | | | | | | |
| Super-Pflex 200 (CaCO3) | | 1 | 2 | 5 | 10 | 2 | 2 | 2 | 2 |
| Carbowax 8000 | | | | | | | | | |
| PEG 6000 | | | | | | | | | |
| PEG 35000 | | | | | | | 1 | 2 | |
| Terpolymer | | | | | | | | | |
| Acetal terpolymer | 0.5 | 0.5 | 0.5 | 0.5 | 0.5 | 0.5 | 0.5 | 0.5 | 0.5 |
| Licowax C | | | | | | | | | |
| Acrawax C | 0.2 | 0.2 | 0.2 | 0.2 | 0.2 | 0.2 | 0.2 | 0.2 | 0.2 |
| Unknown Amide | | | | | | | | | |
| Pentaerithritol tetrastearate | | | | | | | | | |
| Weeks to Delamination | 2 | 12 | 4 | 6 | 4 | 6 | 12 | 7 | 7 |
| Change in TS after Dip Test | | | | | | | | | |
| Wt Change after Dip Test | | | | | | | | | |
| Notched Izod | | 6.3 | | | | | 6.2 | | |
| Notched Charpy | | 7.8 | | | | | 6.6 | | |
| Yield Stress (Mpa) | | | | | | | | | |
| Sec. Mod. (Mpa) | | | | | | | | | |
| Density (g/cc) | | | | | | | | | |

The Dip Test yielded the following results:
Example 5 weight (wt) change of +1.25%
Example V wt change of −1.22%
All other grades tested showed wt. change between −0.25 and +0.25%. Depending on the accuracy of the test, Example 6 and LW50 may have had somewhat less wt. change as compared to Example U or Example I.

Additional data is summarized in Table 6 below.

TABLE 6

| | | Initial wt. (grams) | Final wt. (grams) | Wt change (grams) | % |
|---|---|---|---|---|---|
| Ex. E | 1 | 17.47 | 17.52 | 0.05 | 0.29% |
| Ex. E | 2 | 17.02 | 17.02 | 0 | 0.00% |
| Ex. E | 3 | 17.23 | 17.27 | 0.04 | 0.23% |
| Ex. E | 4 | 17.52 | 17.56 | 0.04 | 0.23% |
| Ex. E | 5 | 16.66 | 16.7 | 0.04 | 0.24% |
| Ex. E | Average | | | 0.034 | 0.20% |
| Ex. F | 1 | 17.33 | 17.37 | 0.04 | 0.23% |
| Ex. F | 2 | 17.23 | 17.27 | 0.04 | 0.23% |
| Ex. F | 3 | 17.25 | 17.29 | 0.04 | 0.23% |
| Ex. F | 4 | 17.15 | 17.19 | 0.04 | 0.23% |
| Ex. F | 5 | 17.31 | 17.34 | 0.03 | 0.17% |
| Ex. F | Average | | | 0.038 | 0.22% |
| Ex. V | 1 | 16.99 | 16.99 | 0 | 0.00% |
| Ex. V | 2 | 16.93 | 16.92 | -0.01 | -0.06% |
| Ex. V | 3 | 17.01 | 17.04 | 0.03 | 0.18% |
| Ex. V | 4 | 17.25 | 17.18 | -0.07 | -0.41% |
| Ex. V | 5 | 17.77 | 16.74 | -1.03 | -5.80% |
| Ex. V | Average | | | -0.216 | -1.22% |
| Ex. W | 1 | 16.91 | 16.94 | 0.03 | 0.18% |
| Ex. W | 2 | 17.28 | 17.31 | 0.03 | 0.17% |
| Ex. W | 3 | 17.26 | 17.3 | 0.04 | 0.23% |
| Ex. W | 4 | 17.24 | 17.28 | 0.04 | 0.23% |
| Ex. W | 5 | 17.1 | 17.14 | 0.04 | 0.23% |
| Ex. W | Average | | | 0.036 | 0.21% |
| EX. X | 1 | 19.55 | 19.58 | 0.03 | 0.15% |
| EX. X | 2 | 19.28 | 19.31 | 0.03 | 0.16% |
| EX. X | 3 | 19.61 | 19.62 | 0.01 | 0.05% |
| EX. X | 4 | 19.61 | 19.64 | 0.03 | 0.15% |
| EX. X | 5 | 19.49 | 19.51 | 0.02 | 0.10% |
| EX. X | Average | | | 0.024 | 0.12% |
| EX. 5 | 1 | 17.95 | 17.98 | 0.03 | 0.17% |
| EX. 5 | 2 | 17.98 | 18 | 0.02 | 0.11% |
| EX. 5 | 3 | 18.2 | 18.23 | 0.03 | 0.16% |
| EX. 5 | 4 | 18.09 | 18.13 | 0.04 | 0.22% |
| EX. 5 | 5 | 17.87 | 18.87 | 1 | 5.60% |
| EX. 5 | Average | | | 0.224 | 1.25% |
| EX. I | 1 | 17.56 | 17.57 | 0.01 | 0.06% |
| EX. I | 2 | 17.59 | 17.56 | -0.03 | -0.17% |
| EX. I | 3 | 17.45 | 17.46 | 0.01 | 0.06% |
| EX. I | 4 | 17.56 | 17.56 | 0 | 0.00% |
| EX. I | 5 | 17.74 | 17.56 | -0.18 | -1.01% |
| EX. I | Average | | | -0.038 | -0.21% |
| Ex. U | 1 | 17.12 | 17.14 | 0.02 | 0.12% |
| Ex. U | 2 | 17.37 | 17.4 | 0.03 | 0.17% |
| Ex. U | 3 | 17.38 | 17.38 | 0 | 0.00% |
| Ex. U | 4 | 17.43 | 17.43 | 0 | 0.00% |
| Ex. U | 5 | 17.51 | 17.49 | -0.02 | -0.11% |
| Ex. U | Average | | | 0.006 | 0.04% |
| EX. M | 1 | 17.34 | 17.22 | -0.12 | -0.69% |
| EX. M | 2 | 16.84 | 16.77 | -0.07 | -0.42% |
| EX. M | 3 | 17.04 | 16.84 | -0.2 | -1.17% |
| EX. M | 4 | 17.08 | 16.89 | -0.19 | -1.11% |
| EX. M | 5 | 17.05 | 16.78 | -0.27 | -1.58% |
| EX. M | Average | | | -0.17 | -1.00% |
| EX. N | 1 | 17.15 | 17.17 | 0.02 | 0.12% |
| EX. N | 2 | 17.23 | 17.24 | 0.01 | 0.06% |
| EX. N | 3 | 17.12 | 17.12 | 0 | 0.00% |
| EX. N | 4 | 16.97 | 16.98 | 0.01 | 0.06% |
| EX. N | 5 | 17.33 | 17.31 | -0.02 | -0.12% |
| EX. N | Average | | | 0.004 | 0.02% |
| Ex. H | 1 | 17.41 | 17.45 | 0.04 | 0.23% |
| Ex. H | 2 | 17.44 | 17.46 | 0.02 | 0.11% |
| Ex. H | 3 | 17.54 | 17.57 | 0.03 | 0.17% |
| Ex. H | 4 | 17.53 | 17.55 | 0.02 | 0.11% |
| Ex. H | 5 | 17.53 | 17.55 | 0.02 | 0.11% |
| Ex. H | Average | | | 0.026 | 0.15% |
| EX. 6 | 1 | 17.61 | 17.63 | 0.02 | 0.11% |
| EX. 6 | 2 | 17.66 | 17.66 | 0 | 0.00% |
| EX. 6 | 3 | 17.56 | 17.53 | -0.03 | -0.17% |
| EX. 6 | 4 | 17.57 | 17.56 | -0.01 | -0.06% |
| EX. 6 | 5 | 17.62 | 17.63 | 0.01 | 0.06% |
| EX. 6 | Average | | | -0.002 | -0.01% |
| LW50 | 1 | 17.56 | 17.56 | 0 | 0.00% |
| LW50 | 2 | 17.63 | 17.64 | 0.01 | 0.06% |
| LW50 | 3 | 17.58 | 17.59 | 0.01 | 0.06% |
| LW50 | 4 | 17.48 | 17.47 | -0.01 | -0.06% |
| LW50 | 5 | 17.63 | 17.6 | -0.03 | -0.17% |
| LW50 | Average | | | -0.004 | -0.02% |
| EX. Z | 1 | 17.49 | 17.49 | 0 | 0.00% |
| EX. Z | 2 | 17.41 | 17.4 | -0.01 | -0.06% |
| EX. Z | 3 | 17.44 | 17.42 | -0.02 | -0.11% |
| EX. Z | 4 | 17.3 | 17.31 | 0.01 | 0.06% |
| EX. Z | 5 | 17.32 | 17.3 | -0.02 | -0.12% |
| EX. Z | Average | | | -0.008 | -0.05% |
| Ex. F | 1 | 17.37 | 17.41 | 0.04 | 0.23% |
| Ex. F | 2 | 17.45 | 17.49 | 0.04 | 0.23% |
| Ex. F | 3 | 17.24 | 17.28 | 0.04 | 0.23% |
| Ex. F | 4 | 17.41 | 17.42 | 0.01 | 0.06% |
| Ex. F | 5 | 17.5 | 17.52 | 0.02 | 0.11% |
| Ex. F | Average | | | 0.03 | 0.17% |
| M50AY | 1 | 17.32 | 17.32 | 0 | 0.00% |
| M50AY | 2 | 17.37 | 17.36 | -0.01 | -0.06% |
| M50AY | 3 | 17.42 | 17.41 | -0.01 | -0.06% |
| M50AY | 4 | 17.44 | 17.41 | -0.03 | -0.17% |
| M50AY | 5 | 17.49 | 17.47 | -0.02 | -0.11% |
| M50AY | Average | | | -0.014 | -0.08% |
| Ex. Y | 1 | 15.32 | 15.44 | 0.12 | 0.78% |
| Ex. Y | 2 | 15.25 | 15.47 | 0.22 | 1.44% |
| Ex. Y | 3 | 15.13 | 15.46 | 0.33 | 2.18% |
| Ex. Y | 4 | 15.28 | 15.46 | 0.18 | 1.18% |
| Ex. Y | 5 | 15.13 | 15.47 | 0.34 | 2.25% |
| Ex. Y | Average | | | 0.238 | 1.57% |
| Ex. 1 | 1 | 15.44 | 15.46 | 0.02 | 0.13% |
| Ex. 1 | 2 | 15.47 | 15.5 | 0.03 | 0.19% |
| Ex. 1 | 3 | 15.46 | 15.46 | 0 | 0.00% |
| Ex. 1 | 4 | 15.46 | 15.46 | 0 | 0.00% |
| Ex. 1 | 5 | 15.47 | 15.5 | 0.03 | 0.19% |
| Ex. 1 | Average | | | 0.016 | 0.10% |
| Ex. 7 | 1 | 15.54 | 15.56 | 0.02 | 0.13% |
| Ex. 7 | 2 | 15.53 | 15.55 | 0.02 | 0.13% |
| Ex. 7 | 3 | 15.54 | 15.55 | 0.01 | 0.06% |
| Ex. 7 | 4 | 15.53 | 15.54 | 0.01 | 0.06% |
| Ex. 7 | 5 | 15.54 | 15.55 | 0.01 | 0.06% |
| Ex. 7 | Average | | | 0.014 | 0.09% |
| Ex. 8 | 1 | 15.76 | 15.78 | 0.02 | 0.13% |
| Ex. 8 | 2 | 15.76 | 15.76 | 0 | 0.00% |
| Ex. 8 | 3 | 15.75 | 15.76 | 0.01 | 0.06% |
| Ex. 8 | 4 | 15.75 | 15.78 | 0.03 | 0.19% |
| Ex. 8 | 5 | 15.75 | 15.78 | 0.03 | 0.19% |
| Ex. 8 | Average | | | 0.018 | 0.11% |
| Ex. 9 | 1 | 16.16 | 16.18 | 0.02 | 0.12% |
| Ex. 9 | 2 | 16.12 | 16.14 | 0.02 | 0.12% |
| Ex. 9 | 3 | 16.12 | 16.13 | 0.01 | 0.06% |
| Ex. 9 | 4 | 16.17 | 16.15 | -0.02 | -0.12% |
| Ex. 9 | 5 | 16.12 | 16.14 | 0.02 | 0.12% |
| Ex. 9 | Average | | | 0.01 | 0.06% |
| Ex. 10 | 1 | 15.53 | 15.54 | 0.01 | 0.06% |
| Ex. 10 | 2 | | | 0 | |
| Ex. 10 | 3 | 15.57 | 15.55 | -0.02 | -0.13% |
| Ex. 10 | 4 | 15.53 | 15.54 | 0.01 | 0.06% |
| Ex. 10 | 5 | 15.54 | 15.53 | -0.01 | -0.06% |
| Ex. 10 | Average | | | -0.002 | -0.02% |
| Ex. 2 | 1 | 15.51 | 15.54 | 0.03 | 0.19% |
| Ex. 2 | 2 | 15.5 | 15.53 | 0.03 | 0.19% |
| Ex. 2 | 3 | 15.51 | 15.52 | 0.01 | 0.06% |
| Ex. 2 | 4 | 15.52 | 15.53 | 0.01 | 0.06% |
| Ex. 2 | 5 | 15.51 | 15.53 | 0.02 | 0.13% |
| Ex. 2 | Average | | | 0.02 | 0.13% |
| Ex. 11 | 1 | 15.54 | 15.55 | 0.01 | 0.06% |
| Ex. 11 | 2 | 15.54 | 15.53 | -0.01 | -0.06% |
| Ex. 11 | 3 | 15.6 | 15.54 | -0.06 | -0.38% |

TABLE 6-continued

|  |  | Initial wt. (grams) | Final wt. (grams) | Wt change (grams) | % |
|---|---|---|---|---|---|
| Ex. 11 | 4 | 15.53 | 15.53 | 0 | 0.00% |
| Ex. 11 | 5 | 15.52 | 15.54 | 0.02 | 0.13% |
| Ex. 11 | Average |  |  | −0.008 | −0.05% |
| Ex. 12 | 1 | 15.51 | 15.51 | 0 | 0.00% |
| Ex. 12 | 2 | 15.52 | 15.52 | 0 | 0.00% |
| Ex. 12 | 3 | 15.52 | 15.51 | −0.01 | −0.06% |
| Ex. 12 | 4 | 15.53 | 15.53 | 0 | 0.00% |
| Ex. 12 | 5 | 15.53 | 15.52 | −0.01 | −0.06% |
| Ex. 12 | Average |  |  | −0.004 | −0.03% |

The change in tensile strength and elongation at yield was measured after the dip test in bleach. The only grade tested that had a change in tensile strength at yield of more than 1% was Example F. Similarly, the elongation at yield reduced the most, 1.3%, for Example Q. Example 6 also had a reduction of 1.1% in elongation at yield and only a 0.6% reduction in tensile strength. A preferred stabilization package included 0.5% Irganox 245, 0.08% Tri Calcium citrate, 0.02% Calcium Propionate along with 0.2% Acrawax C as a mold release. Examples 3, 4 and BB below are particularly preferred compositions.

TABLE 7

|  | COMPOSITION | | | | | | | | | |
|---|---|---|---|---|---|---|---|---|---|---|
|  | Ex. U (%) | Ex. 1 (%) | Ex. 2 (%) | Ex. 6 (%) | Ex. I (%) | Ex. Z (%) | Ex. AA (%) | Ex. 3 (%) | Ex. 4 (%) | Ex. BB (%) |
| M50-00 |  |  |  |  |  | 99.2 | 98.4 | 98.7 | 98.2 | 97.4 |
| M90-00 | 98.8 | 97.7 | 94.7 | 96.7 | 98.7 |  |  |  |  |  |
| C 1300-00 Low Common |  |  |  |  |  |  |  |  |  |  |
| M90UP |  |  |  |  |  |  |  |  |  |  |
| M15HP-00 |  |  |  |  |  |  |  |  |  |  |
| Low Common MI 3 |  |  |  |  |  |  |  |  |  |  |
| Low Common MI 13 |  |  |  |  |  |  |  |  |  |  |
| Low Common MI 10 |  |  |  |  |  |  |  |  |  |  |
| Irganox 245 |  |  |  |  |  |  | 0.5 | 0.5 | 0.5 | 0.5 |
| Irganox 259 | 0.35 | 0.5 | 0.5 | 0.5 | 0.5 | 0.5 |  |  |  |  |
| Melamine |  |  |  |  |  |  |  |  |  |  |
| Glyceryl Monostearate |  |  |  |  |  |  |  |  |  |  |
| Tricalcium citrate |  |  |  |  |  |  | 0.08 | 0.08 | 0.08 | 0.08 |
| Calcium Propionate |  |  |  |  |  |  | 0.02 | 0.02 | 0.02 | 0.02 |
| Calcium Ricinoleate |  |  |  |  |  | 0.1 |  |  |  |  |
| Eurelon 975 |  |  |  |  |  |  |  |  |  |  |
| El/Sucon | 0.15 |  |  |  |  |  |  |  |  |  |
| Calcium 12 Hydroxy Stearate |  |  |  |  | 0.1 |  |  |  |  |  |
| Calcium Citrate |  |  |  |  |  |  |  |  |  |  |
| Dicyandiamide/CNG |  | 0.1 | 0.1 | 0.1 |  |  |  |  |  |  |
| Zinc oxide |  |  |  |  |  |  |  |  |  |  |
| Titanium dioxide |  |  |  |  |  |  |  |  |  |  |
| Mg(OH)2 |  |  |  |  |  |  |  |  |  |  |
| Super-Pflex 200 (CaCO3) |  | 1 | 2 | 2 |  |  |  | 0.5 | 1 | 2 |
| Carbowax 8000 |  |  |  |  |  |  |  |  |  |  |
| PEG 6000 |  |  |  |  |  |  |  |  |  |  |
| PEG 35000 |  |  | 2 |  |  |  |  |  |  |  |
| Terpolymer |  |  |  |  |  |  |  |  |  |  |
| Acetal terpolymer | 0.5 | 0.5 | 0.5 | 0.5 | 0.5 |  |  |  |  |  |
| Licowax C |  |  |  |  |  |  |  |  |  |  |
| Acrawax C | 0.2 | 0.2 | 0.2 | 0.2 | 0.2 | 0.2 | 0.2 | 0.2 | 0.2 | 0.2 |
| Unknown Amide |  |  |  |  |  |  |  |  |  |  |
| Pentaerithritol tetrastearate |  |  |  |  |  |  |  |  |  |  |
| Weeks to Delamination | 2 | 12 | 12 | 8 | 4 |  | 5 | 13 | 12 | 6 |
| Change in TS after Dip Test | 0.2 |  |  |  | 0.6 |  | 2.3 | −0.5 | −1.5 | −2.2 |
| Wt Change after Dip Test | 0.04 |  |  | −0.01 | −0.21 | −0.05 | −0.16 | −0.05 | −0.03 | −0.07 |
| Notched Izod | 5.5 | 6.3 | 6.2 | 5.7 | 5.5 | 7.3 |  | 7.1 | 7.1 |  |
| Notched Charpy | 5.8 | 7.8 | 6.6 |  | 5.8 | 7.6 |  | 7.4 | 7.4 |  |
| Yield Stress (Mpa) |  |  |  |  |  | 63.4 |  | 63.9 | 63.9 |  |
| Sec. Mod. (Mpa) |  |  |  |  |  | 2672 |  | 2650 | 2670 |  |
| Density (g/cc) |  |  |  |  |  | 1.406 |  | 1.411 | 1.413 |  |
| Color L (+=white) |  |  |  |  |  | 68 | 69 | 72 | 74 |  |
| L aged |  |  |  |  |  | 87 | 88 | 90 | 90 |  |

TABLE 7-continued

| | COMPOSITION | | | | | | | | | |
|---|---|---|---|---|---|---|---|---|---|---|
| | Ex. U (%) | Ex. 1 (%) | Ex. 2 (%) | Ex. 6 (%) | Ex. I (%) | Ex. Z (%) | Ex. AA (%) | Ex. 3 (%) | Ex. 4 (%) | Ex. BB (%) |
| Color b (+=yellow) | | | | | | 1.9 | −2.2 | −1.5 | −0.6 | |
| b aged | | | | | | 1.2 | 2.5 | 1.6 | 1.4 | |
| Color a (+=red) | | | | | | −1.8 | −1.5 | −1.7 | −1.7 | |
| a aged | | | | | | −2.2 | −1.3 | −1.3 | −1.2 | |

TABLE 8

| | Notched Izod Str. (KJ/sq_m) | Notched Charpy Str. (KJ/sq_m) |
|---|---|---|
| Example 1 | 6.3 | 7.8 |
| Example 2 | 6.2 | 6.6 |
| Example 1E | 7.4 | 8.5 |
| M50AY | 7.4 | 8.1 |

The range of 0.5% to 1.0% of CaCO$_3$ is better than the 2% found in Example 6 since the time to delamination are 12 and 13 weeks compared to 8 weeks for Example 6. The addition of between 0.5% –1.0% of CaCO$_3$ does not seem to affect the physical properties of the material significantly. Also, the color of the as-molded parts is better, a little more white and blue (more blue means less yellow). The change in tensile strength after the 5-day dip test is also included in Table 7.

Figure 4A:
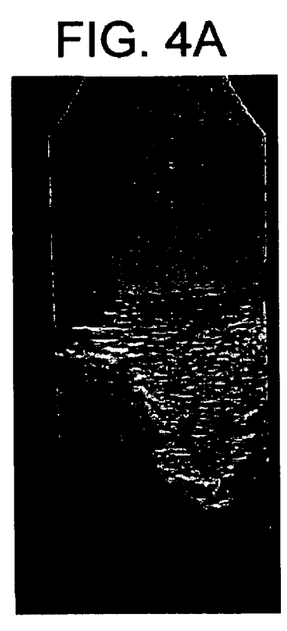
FIG. 4 is a photograph illustrating delamination of a test bar prepared without a bleach stabilizer and resistance to delamination of a bar prepared with a calcium carbonate containing composition.
Figure 4B:
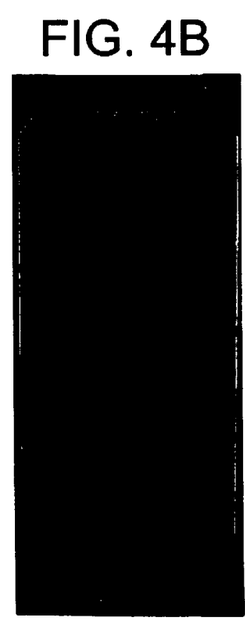
Figure 4C:
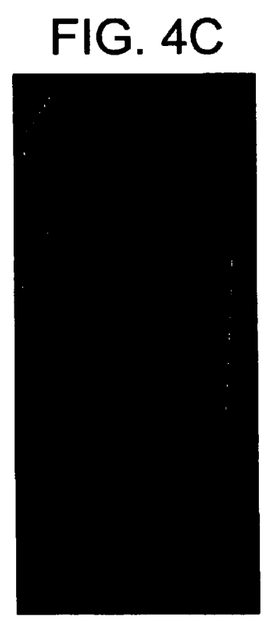

The remarkable bleach resistance of injection-molded parts made with compositions of the invention is in many respects best appreciated from FIG. 4. In FIG. 4(a) (at left) delamination is shown on injection-molded tensile bar made from an unstabilized polyoxymethylene composition which was immersed in bleach for two (2) weeks, next to an "as-molded" test specimen (4b). On the right, at 4(c), there is shown a test bar injection-molded from a composition of the invention which was immersed in bleach for 12 weeks.

As can be seen from the photographs, the specimen of 4(a) exhibited delamination over roughly 20% of the treated surface, while the molded bar made from the compositions of the invention exhibited no delamination in 12 weeks, despite exposure to the corrosive environment for six times as long.

While the invention has been described in detail in connection with numerous examples, modification to those embodiments illustrated within the spirit and scope of the present invention, set forth in the appended claims, will be readily apparent to those of skill in the art.

What is claimed is:

1. A molding composition exhibiting bleach resistance comprising a polyoxymethylene matrix polymer, wherein the polyoxymethylene is selected from the group consisting of oxymethylene copolymers comprising about 90 to about 99.9 percent oxymethylene repeat units interspersed with repeat units derived from ethylene oxide or 1,3 dioxolane, wherein said molding composition further comprises from about 0.5 to about 10 weight percent of a bleach stabilizer selected from alkali metal or alkaline earth element carbonates or phosphates and mixtures thereof dispersed in the matrix resin and a bleach co-stabilizer selected from the group consisting of:
(a) a poly(alkoxy) stabilizer;
(b) a zinc oxide stabilizer;
(c) a color stabilizer consisting of a mixture of calcium citrate and calcium propionate, wherein the calcium citrate is the predominant component of the color stabilizer mixture, and wherein said calcium citrate is in an amount of about 0.05–0.1 weight % ; or
(d) mixtures of two or more of (a), (b) and (c); and
wherein the composition exhibits a bleach resistance index of at least 2.0.

2. The molding composition according to claim 1, wherein the composition comprises from about 0.5 to about 2 weight percent of bleach stabilizer.

3. The molding composition according to claim 1, wherein the composition comprises from about 0.5 to about 1.5 weight percent of bleach stabilizer.

4. The composition according to claim 1, wherein said calcium propionate is in an amount of about 0.01–0.05 weight %.

5. The composition according to claim 1, wherein the poly(alkoxy) stabilizer is polyethylene glycol.

6. The present composition according to claim 5, wherein the polyethylene glycol is in an amount of about 0.25–5.0 weight %.

7. The composition according to claim 1, wherein the bleach stabilizer is selected from the group consisting of: calcium carbonate, sodium carbonate, potassium carbonate and barium carbonate.

8. The composition according to claim 7, wherein the bleach stabilizer is calcium carbonate.

9. The composition according to claim 8, further comprising at least one hindered phenol selected from the group comprising: hexamethyleneglycol-bis(3,5-di-t-butyl-4-hydroxyhydrocinnamate), 2,2'-methylenebis(4-methyl-6-t-butylphenol), hexamethyleneglycol-bis(3,5-di-t-butyl-4-hydroxyhydro-cinnamate), tetrabis[methylene(3,5-di-t-butyl-4-hydroxyhydro-cinnamate)]methane, triethyleneglycol-bis-3-(3-t-butyl-760 4-hydroxy-5-methylphenyl)propionate, 1,3,5-trimethyl-2,4,6-tris(3,5-di-t-butyl-4-hydroxy-benzyl)-benzene, p-octadecyl-3-(4'-hydroxy-3',5'-di-t-butyl-phenol)propionate, 4,4'-methylenebis(2,6-di-t-butylphenol), 4,4'-butylidene-bis-(6-t-butyl-3-methylphenol), 2,2'-thiodiethyl-bis-3-(3,5-di-t-butyl-4-hydroxyphenol)propionate, di-stearyl-3,5-di-t-butyl-4-hydroxybenzylphosphonate and 2-t-butyl-6-(3-t-butyl-5-methyl-2-hydroxybenzyl)-4-methylphenylacrylate, hexamethyleneglycol-bis(3,5-di-t-butyl-4-hydroxyhydrocinnamate), tetrakis[methylene(3,5-di-t-butyl-4-hydroxyhydrocinnamate)] methane and triethyleneglycol-bis-3-(3-t-butyl-4-hydroxy-5-methylphenyl)propionate.

10. The composition according to claim 9, wherein the hindered phenol is at least one hindered phenol selected from the group consisting of: hexamethyleneglycol-bis(3,5-di-t-butyl-4-hydroxyhydrocinnamate) and triethyleneglycol-bis-3-(3-t-butyl-4-hydroxy-5-methylphenyl)propionate.

11. The according to according to claim 10, wherein the hindered phenol is in an amount of about 0.25–1.0 weight %.

12. The composition according to claim 11, comprising:
(a) at least about 94.0 weight percent of a polyoxymethylene copolymer; and
(b) from about 0.01 to 0.1 weight percent of color stabilizer.

13. The composition according to claim 1, wherein the composition exhibits a bleach resistance index of at least 2.5.

14. The composition according to claim 1, wherein the composition exhibits a bleach resistance index of at least 3.0.

15. An injection molded part adapted for interfacing aqueous bleach prepared from a composition comprising a polyoxymethylene matrix polymer, from about 0.5 to about 10 weight percent of calcium carbonate dispersed in the matrix polymer, and a bleach co-stabilizer selected from the group consisting of:
(a) a poly(alkoxy) stabilizer;
(b) a zinc oxide stabilizer;
(c) a color stabilizer consisting of a mixture of calcium citrate and calcium propionate, wherein the calcium citrate is the predominant component of the stabilizer mixture; or
(d) mixtures of two or more of (a), (b) and (c); and
wherein the composition exhibits a bleach resistance index of at least 2.0.

16. The injection molded part according to claim 15, wherein the composition comprises from about 0.5 to about 2.0 weight percent of calcium carbonate.

17. The injection molded part according to claim 15, wherein the composition comprises from about 0.5 to about 1.5 weight percent of calcium carbonate.

18. The injection molded part adapted for interfacing aqueous bleach according to claim 15, further comprising at least one hindered phenol selected from the group comprising: hexamethyleneglycol-bis(3,5-di-t-butyl-4-hydroxyhydrocinnaniate), 2,2'-methylenebis(4-methyl-6-t-butylphenol), hexamethyleneglycol-bis(3,5-di-t-butyl-4-hydroxyhydrocinnamate), tetrabis[methylene(3,5-di-t-butyl-4-hydroxyhydro-cinnamate)]methane, triethyleneglycol-bis-3-(3-t-butyl-4-hydroxy-5-methylphenyl)-propionate, 1,3,5-trimethyl-2,4,6-tris(3,5-di-t-butyl-4-hydroxy-benzyl)-benzene, p-octadecyl-3-(4'-hydroxy-3',5'-di-t-butyl-phenol)propionate, 4,4'-methylenebis(2,6-di-t-butylphenol), 4,4'-butylidene-bis-(6-t-butyl-3-methylphenol), 2,2'-thiodiethyl-bis-3-(3,5-di-t-butyl-4-hydroxyphenol)propionate, di-stearyl-3,5-di-t-butyl-4-hydroxybenzylphosphonate and 2-t-butyl-6-(3-t-butyl-5-methyl-2-hydroxybenzyl)-4-methylphenylacrylate, hexamethylene-glycol-bis(3,5-di-t-butyl-4-hydroxyhydrocinnamate), tetrakis[methylene(3,5-di-t-butyl-4-hydroxyhydrocinnamate)] methane and triethyleneglycol-bis-3-(3-t-butyl-4-hydroxy-5-methylphenyl)propionate.

19. The injection molded part adapted for interfacing aqueous bleach according to claim 18, wherein the hindered phenol is at least one hindered henol selected from the group consisting of: hexamethyleneglycol-bis(3,5-di-t-butyl-4-hydroxyhydrocinnamate) and triethylene-glycol-bis-3-(3-t-butyl-4-hydroxy-5-methyiphenyl)propionate.

20. The injection molded part adapted for interfacing aqueous bleach compositions prepared according to claim 15, wherein the part is selected from the group consisting of: housing components, washers, bearings, valves, gears, impellers, jets, fittings, nozzles, elbows, detergent baskets, grommets, flanges, tumblers, pump components, blades, shafts, conduits and the like.

21. The injection molded part according to claim 15, wherein the composition exhibits a bleach resistance index of at least 2.5.

22. The injection molded part according to claim 15, wherein the composition exhibits a bleach resistance index of at least 3.0.

* * * * *